United States Patent [19]

Walker

[11] 3,724,103

[45] Apr. 3, 1973

[54] METHOD FOR EDUCATIONAL TEST PREPARATION

[76] Inventor: Donald Walker, 2603 Greenfield Avenue, West Los Angeles, Calif. 90064

[22] Filed: Dec. 17, 1971

[21] Appl. No.: 209,035

[52] U.S. Cl. ................................................. 35/48 A
[51] Int. Cl. ............................................. G09b 1/06
[58] Field of Search ................. 35/7, 48, 48 A, 16, 26

[56] References Cited

UNITED STATES PATENTS

| | | | |
|---|---|---|---|
| 3,421,239 | 1/1969 | Smith | 40/19.5 |
| 3,460,281 | 8/1969 | Levy | 35/7 R |
| 3,555,702 | 1/1971 | Van Kirk | 35/7 R |
| 3,466,217 | 9/1969 | Mott | 35/26 UX |
| 3,077,666 | 2/1963 | Kump | 35/26 UX |
| 2,137,736 | 11/1938 | Watkins | 35/48 A |

Primary Examiner—Robert W. Michell
Assistant Examiner—J. H. Wolff
Attorney—Lynn H. Latta

[57] ABSTRACT

Adhesive-back question-bearing slips are taken from a teacher's file and affixed to a copy holder which consists of a back sheet to which the slips are adhesively attached, and a transparent cover or flap which folds downwardly from its upper margin over the back sheet, and which is imprinted with suitable heading data. The composite of back sheet, with attached question-bearing slips, and transparent fold-over part, constitutes a master copy which is inserted in a duplicator and reproduced in sufficient quantity to provide test sheets for all pupils of a class taking an examination, the heading data as well as the questions appearing on each test sheet. When duplication is completed, the copy holder is removed from the duplicator, the question slips are detached from the copy holder, and the slips are returned to the teacher's file for preservation for possible future use.

8 Claims, 7 Drawing Figures

PATENTED APR 3 1973 3,724,103

Which of the color coded resistors is largest:
1. orange, white, black
2. yellow, violet, black
3. green, blue, black
4. blue, grey, black INVENTOR.
DONALD (nmi) WALKER
BY
Lynn H Latta
-ATTORNEY-

METHOD FOR EDUCATIONAL TEST PREPARATION

BACKGROUND OF THE INVENTION

Heretofore a considerable amount of work has been required of a teacher in preparing a set of questions for a quizz or test to be submitted to the pupils of his class, and in later grading the pupils' answers to the questions. Duplicating machines for multi-copying a prepared question sheet of course have been available and widely used, but after typing and reproducing the question sheets in multiple copies for use by the pupils, it is still necessary for the teacher to provide a list of answers to the questions, and to compare them to the pupils' answers in grading the papers, expending considerable time and mental effort in doing so. Among the prior efforts to attack this problem, the prior art discloses, in Atherton U.S. Pat. No. 3,128,564, the concept of preparing a master sheet having questions and a second master sheet bearing the same questions associated with answers for comparison with students' answers on test sheets. However, the task of typing the questions and answers (the questions only on the question master and the answers on the answer master) still remains to be performed by the teacher. In the field of artwork preparation, the Schulze U.S. Pat. No. 3,353,281 and the Esses U.S. Pat. No. 3,499,377 disclose the concept of superimposing a transparent sheet bearing portions of a design over an underlying sheet bearing other portions of the design, and then photographing the superimposed sheets to produce a composite. They do not, however, deal with a teacher's problem of correlating questions and answers in preparing for a test, and of correcting pupils' answers after the test.

RESUME OF THE INVENTION

The present invention provides a system in which questions are imprinted on a plurality of adhesive-back slips for attachment to a copy-holder sheet in panels suitably designated, as by framing in fine lines. Identical permanent record questions are provided (e.g. printed) on the teacher's file sheet, each question being associated with an answer which, for example, may be indicated by an asterisk opposite one of several selective answers forming part of the question. The adhesive-back question slips are normally mounted over the questions on the teacher's file sheet and are detached by the teacher for attachment to the copy holder sheet which is overlaid by the transparent cover sheet or flap to provide a composite used as a master for multiple copy reproduction. After the required number of test sheets are reproduced, the copy holder is removed from the duplicator and the question bearing slips are detached from the copy holder and affixed to the teacher's file sheet over the identical questions thereon, to preserve them for possible future use. By reference to the answers on his file sheet, the teacher marks the correct answers on one of the duplicated test sheets, to be used by him in correcting the pupil's test papers after the test.

By following this procedure, the requirement for typing by the teacher in preparing the test can be entirely eliminated, except as he may choose to type the correct answer indicating marks on his reference test sheet. The general object of the invention, then, is to provide a system which minimizes the amount of test-preparation work required of the teacher, and which also minimizes the task of checking pupil's test papers.

This and other objects will become apparent in the ensuing specification and appended drawing, in which.

DESCRIPTION

Referring now to FIGS. 1, 2, 4 and 7 of the drawings, I have shown therein, as an example of one form of apparatus in which the invention may be embodied, a test preparation and recording system comprising, in general, a teacher's file sheet A (FIG. 1) on which is normally mounted a set of question-bearing slips B; a copy holder C (FIG. 2) to which the slips B are transferred to prepare a master for multiple copying; and a pupil's test sheet D (FIG. 4) which is one of a number of copies prepared by reproducing the master in a duplicating machine.

Figure 1:
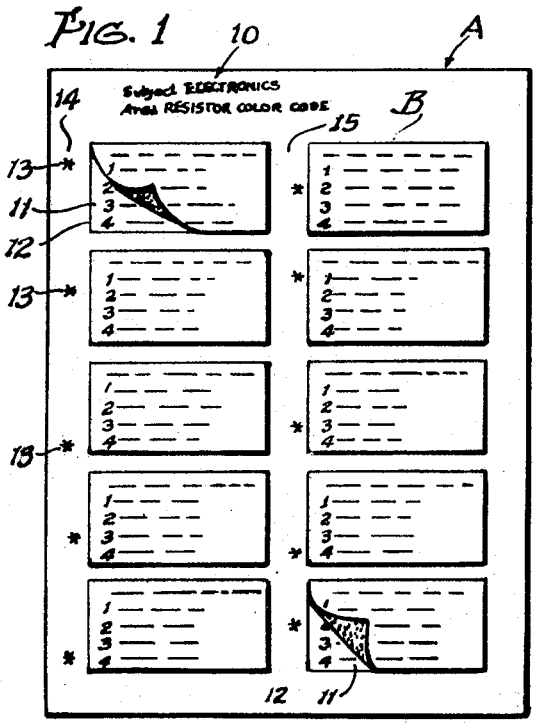
FIG. 1 is a face view of a teacher's file sheet with attached question-bearing slips, as provided by the invention.

The teacher's file sheet has a heading 10 comprising suitable legends such as "Subject" and "Area," and has a permanent set of questions 11 printed thereon in respective panels 12 designated by light border lines. Two of the pre-printed permanent questions 11 and their printed panels 12 are seen in FIG. 1 beneath lifted corners of the question-bearing slips B which normally cover them. The file sheet A also is provided with answer-indicator marks 13 which may be in the form of asterisks and are located opposite the correct answers of groups of several suggestive answers embodied in each of the questions. The answer indicator marks are visible in vertically extending spaces 14 and 15, the former bordering the leftward margin of the leftward column of question-bearing slips B and the latter disposed between and separating the two columns of slips.

Figure 5:
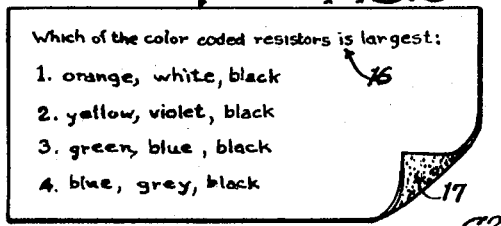
FIG. 5 is a face view of one of the question-bearing slips, showing an example of a question embodying a number of selective answers one of which is correct as indicated on the teacher's file sheet where the questions are duplicated.

FIG. 5 illustrates one of the Question-bearing slips by way of example. Its front face is imprinted with a question 16 followed by several suggestive answers which may be numbered as at 1, 2, 3 and 4 respectively. Its back face is coated with a pressure-sensitive adhesive 17 such that it may be detached from the file sheet A to which it is normally adhered, and may be successively adhered to the copy holder C and again to the file sheet A. The suggestive answers are located near the end of the slip which is associated with the mark 13 which indicates which of the suggestive answers is the correct one. The questions on slips B are identical to corresponding questions permanently printed on file sheet A at 11, with the exception that the latter have the indicator marks 13 associated with them.

Copy holder C is in the form of a folder having a back sheet 20 on which are printed a plurality of panels 21 equal in number to the panels 12 of file sheet A; and a cover or front sheet 22 of transparent sheet material, attached to the top margin of back sheet 20 by a hinge 23. Cover 22 is imprinted with a heading 24, a plurality of frames 25 positioned to register with panels 21 of back sheet 20, and question-numbering numerals 26 disposed on vertical columns along the leftward margin of the cover and in a space separating the columns of frames 25, respectively. Frames 25 are delineated by heavy lines such as to obscure the shadows cast by the edges of slips B when the latter are attached to back 20 in positions registering with panels 21 and the copy holder, with the cover 22 closed against the columns of slips B, is placed in a duplicator and multiple copies are made from it. On the pupil's test sheet D resulting from the copying, the questions 11, showing through the transparent spaces delineated by frames 25, will be reproduced along with the frames 25, the question-numbering numerals 26, and the heading 24, all designated by the same reference numerals in FIG. 4. The numerals 26 will appear in the marginal spaces bordering the leftward margins of the columns of questions 11.

Figure 2:
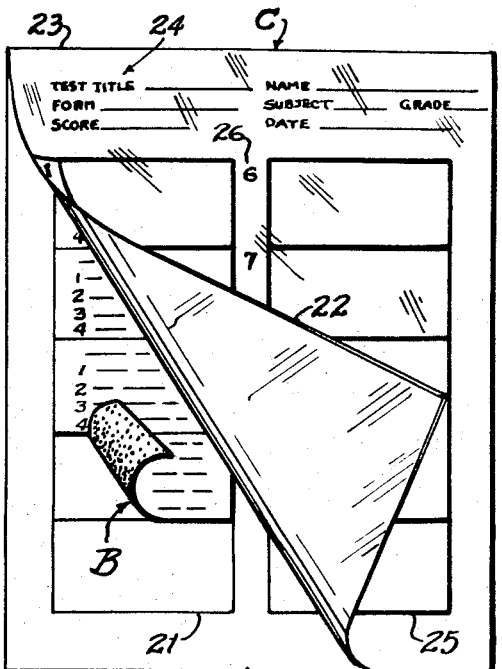
FIG. 2 is a face view of a copy-holder folder, partly opened up, as provided by the invention in one of its embodiments.
Figure 3:
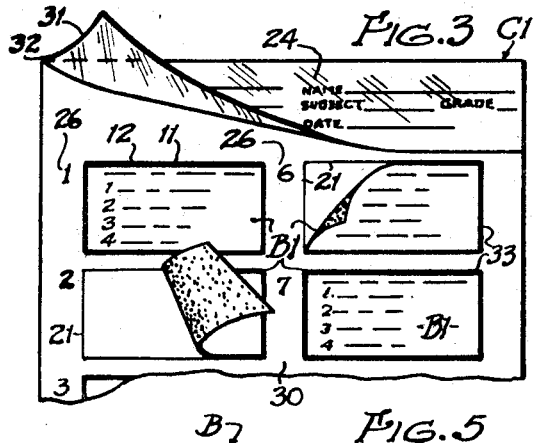
FIG. 3 is a fragmentary face view of a modified form of the copy holder.

In the modified form of the invention shown in FIG. 3, a copy holder C1 comprises a back sheet 30 and a flap 31 attached to the top margin thereof by a hinge 23. Heading data 24 is printed on flap 31. Position registering lines 21 are printed on back sheet 30 in panels 12, and question-numbering numerals 26 are likewise printed on sheet 30. Question-bearing slips B1 are the same as slips B of FIGS. 1 and 2 with the addition of heavy-line framing margins 31 imprinted along their edges, to mask the shadow lines cast by the edges during copying. Slips B1 are normally attached adhesively to a file sheet such as shown in FIG. 1, and are removed for test preparation and adhesively attached to back sheet 30 of the copy holder, designated by reference numeral C1 in FIG. 3.

Figure 6:
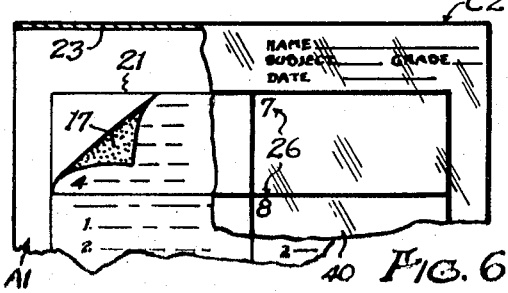
FIG. 6 is a fragmentary breakaway face view of another modified form of copy holder.
Figure 7:
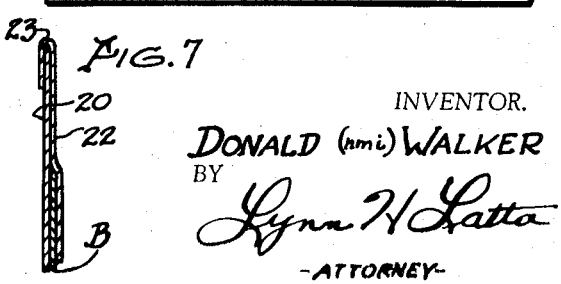
FIG. 7 is a fragmentary sectional view of the top of a master prepared as in FIG. 2.

FIG. 6 illustrates how the question-bearing slips B can be mounted in copy holder C2 in marginally abutting relation over printed-line panels 21 the same as in FIG. 2, differing from those of FIG. 2 in being printed in abutting relation without separating spaces between them. The columns of Question-numbering numerals are imprinted on cover 40 of transparent material in positions to register with the upper left corners of question-bearing slips B instead of in marginal spaces: and the frames 25 are printed on cover 40 in abutting postions to correspond to the positions of question-bearing slips B, but are otherwise the same as in FIG. 2.

THE METHOD

Figure 4:
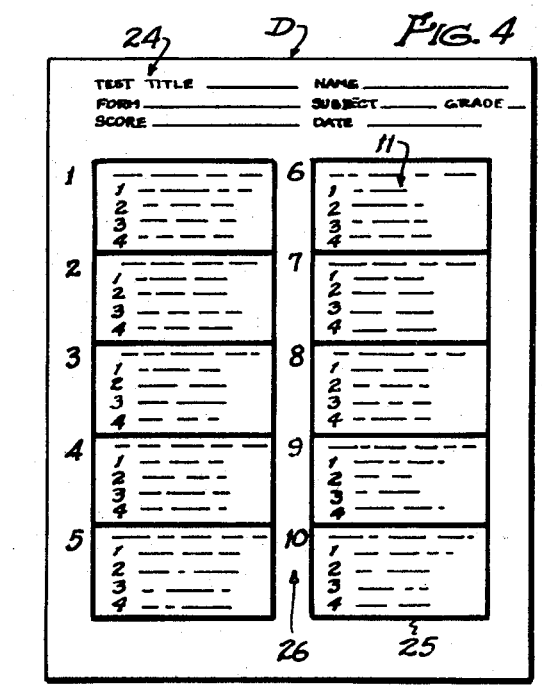
FIG. 4 is a face view of a pupil's test sheet resulting from multiple-copying of a master developed as illustrated in FIG. 2.

While the method of using the apparatus to embody the procedure of the invention has largely been explained in the preceding description, it will here be reviewed in the order of its steps. In his file, the teacher will have a number of file sheets containing respective groups of questions, each group relating to a particular area (e.g. Resistor Color Code) of a general subject (e.g. Electronics) as indicated in FIG. 1. The headings 10 of the various file sheets designate the respective areas and the subjects of which they are a division. To prepare for a test on a selected subject area, the teacher merely goes to his file and removes the file sheet for that area. He then detaches the question-bearing slips mounted on that file sheet and transfers them into the copy-holder folder C, attaching them to its back sheet 20 in positions registering with the printed panels 21, to properly locate them for copying. When all slips B are thus attached, the transparent cover 22 is closed over them, and they will then appear through the printed frames 25 of the cover, and will be framed by the frames 25, while the heading 24 is properly positioned above the question columns and the question numbers 26 are located between the columns in positions suitably associated with the respective questions. The folder C is then inserted in a copying machine and the required number of copies is made. The composite of questions showing through the cover 22 and data imprinted on the face of the cover, will then appear on the copies as shown in FIG. 4, to provide a plurality of test sheets for the pupils and a check sheet for the teacher. The copying being completed, the teacher will remove the slips B from folder C and reattach them to his file sheet A, placing each question over the identical question printed at 11 on the file sheet, in registration with the respective printed panel 12, so that the asterisks 13 on the file sheet will register with the correct answer for each question. With the correct answers thus indicated, the teacher may mark one of the test sheets D to indicate the correct answers, for his use as a check sheet in correcting the papers of the pupils. This check sheet may then be filed (e.g. in a notebook) for record purposes.

It may be noted that an asterisk 13, together with the selective answer with which it is registered, cooperatively constitute an answer in the printed data 11, 13 on the file sheet A. While an asterisk is shown by way of example, other equivalent answer-indicator means could be employed, and instead of the several selective answers embodied in the questions as shown, the slips B could contain merely the bare questions with blank spaces for answers to be written in by the pupils, and the correct answers could be printed in full text in the corresponding spaces in printed permanent questions 11 of the file sheet A.

I claim:

1. A method of preparation by a teacher of question sheets for use by pupils in answering test questions, comprising the following steps:

storing a plurality of question-bearing slips on a teacher's file sheet having the identical questions and associated answers printed thereon, said slips being adhesively attached to said file sheet in positions covering the corresponding printed questions;

removing said slips from said teacher's file sheet and from the answers thereon, transferring them to a copy holder having thereon printed means for locating said slips in predetermined positions, and affixing the slips adhesively to said copy holder in positions thus located, whereby to prepare a master for multiple copying;

reproducing a required number of copies of said master in a duplicator in a multiple copying step so as to provide pupils' test sheets on which said questions appear without answers;

distributing said test sheets to a group of pupils and conducting a test in which the answers are supplied by the pupils on their respective test sheets;

removing said question-bearing slips from said copy holder, returning them to said teacher's file sheet, and adhesively attaching them thereto in positions covering the same questions printed thereon, with said answers correctly associated with the questions on said slips; and utilizing said associated answers for reference to provide for checking pupils' responses on said test papers.

2. The method defined in claim 1, including the step of preserving said teacher's file sheet, with said question-bearing slips attached, for possible further use.

3. The method defined in claim 1, including the step of adding answers to one of said test sheets to convert it into a teacher's check sheet for reference in said step of checking pupils' responses.

4. The method defined in claim 1, including the step of utilizing heading data printed on a transparent fold-over part of said copy holder, to be reproduced in said multiple-copying step so as to provide a heading for each test paper.

5. The method defined in claim 1, including the step of utilizing, as part of said copy holder, a transparent fold-over cover having printed thereon, in heavy lines, frames registering with the edges of the question-bearing slips underlying said cover, whereby to mask the shadow lines cast by said edges in said copying step.

6. The method defined in claim 1, including the step of utilizing, as part of said copy holder, a transparent cover having question numbers printed thereon in positions to register with extremities of respective question-bearing slips underlying said cover, whereby to effect numbering of the questions reproduced on said test sheets.

7. The method defined in claim 6:

said question numbers being positioned in spaces adjoining the margins of columns in which said questions appear through said cover.

8. The method defined in claim 6:

said question numbers being positioned to be superimposed over upper left corner areas of the questions on said slips as they appear through said cover.

* * * * *